US007881034B2

(12) United States Patent
Lee et al.

(10) Patent No.: US 7,881,034 B2
(45) Date of Patent: Feb. 1, 2011

(54) SURGE PROTECTOR WITH SPATIAL VARIATION

(75) Inventors: Yu-Lung Lee, Nanjhuang Township, Miaoli County (TW); Ming-Chou Kuo, Taipei (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 322 days.

(21) Appl. No.: 12/232,402

(22) Filed: Sep. 17, 2008

(65) Prior Publication Data

US 2010/0020460 A1 Jan. 28, 2010

(30) Foreign Application Priority Data

Jul. 23, 2008 (TW) .............................. 97127959 A

(51) Int. Cl.
*H02H 1/00* (2006.01)

(52) U.S. Cl. ....................................... 361/118; 361/117

(58) Field of Classification Search ......... 361/117–119; 439/210, 211, 214, 654
See application file for complete search history.

(56) References Cited

U.S. PATENT DOCUMENTS 6,220,880 B1 * 4/2001 Lee et al. .................... 439/214
6,220,897 B1 * 4/2001 Maxwell ..................... 439/652

* cited by examiner

*Primary Examiner*—Danny Nguyen
(74) *Attorney, Agent, or Firm*—Rosenberg, Klein & Lee

(57) ABSTRACT

A surge protector with spatial variation includes a housing, a body, a lifting means, and an operating means. The housing has an opening and an accommodating space. The opening and the accommodating space are in communication with each other. The body is accommodated in the accommodating space. The wall surface of the body is provided with a plurality of outlet units. The lifting means is connected between the housing and the body, thereby driving the body to move in the accommodating space. The operating means is used to abut and fix the body. In operation, a user controls the operating means to release the body, so that the body is driven by the lifting means to move upwardly. In this way, the plurality of outlet units will be exposed to the outside of the opening, so that the user can have more outlet unit choices at various spatial elevations.

10 Claims, 5 Drawing Sheets

SURGE PROTECTOR WITH SPATIAL VARIATION

BACKGROUND OF THE INVENTION

1. Field of the Invention

The present invention relates to a surge protector, and in particular to a surge protector with spatial variation, in which a driving means is provided, so that the outlets of the surge protector can be lifted or lowered according to the user's control; thus, the user can use the outlets in different orientations easily, thereby satisfying the user's demands.

2. Description of Related Art

With the discovery and application of electricity, the usage of electricity has become a necessity for our daily life. For example, various electric appliances such as a television, electric lamp, refrigerator, washing machine, or the like employ electricity as power for operation.

Generally, electric appliances are each provided with a power plug. A user only needs to insert the power plug into the outlet provided on the wall of a house, thereby providing the necessary power for the operation of the electric appliance. However, since the power line length of the electric appliance that is used to connect to the power outlet is limited, an extension socket is sometimes used to increase the operating range of the electric appliance, thereby facilitating the user with the use of the electric appliance.

Please refer to FIG. 1, the conventional extension socket comprises a socket body 1*a*, a plurality of outlets 2*a*, an electric line 3*a*, and a power plug 4*a*. The plurality of outlets 2*a* is provided on the socket body 1*a*, so that the plurality of outlets 2*a* can be electrically connected to a plurality of electric appliances (not shown). The electric line 3*a* is electrically connected between the socket body 1*a* and the power plug 4*a*, thereby extending the operating range of the socket body 1*a*. In operation, the power plug 4 is inserted into the power outlet (not shown) on the wall of a house. The electricity is introduced into the socket body 1*a* via the electric line 3*a*, and then is delivered to the plurality of outlets 2*a*. The user only needs to insert the power plugs of the plurality of electric appliances (not shown) into the outlets 2*a* respectively, so that the plurality of electric appliances can be provided with the necessary power for their operation.

Although the conventional extension socket can extend the operating range of the electric appliance, the conventional extension socket has drawbacks as follows.

(I) The number of the outlets is limited, and it is impossible to expand the number of outlets.

(II) The conventional extension socket can only be used in one direction (i.e. only be plugged in from one direction), which is very inconvenient.

Consequently, because of the above limitation resulting from the technical design of prior art, the inventor strives via real world experience and academic research to develop the present invention, which can effectively improve the limitations described above.

SUMMARY OF THE INVENTION

The object of the present invention is to provide a surge protector with spatial variation. With the lifting and lowering of a body of the surge protector, the function of an outlet unit can be expanded. A user can select the outlet units in different orientations according to practical demands.

In order to achieve the above objects, the present invention provides a surge protector with spatial variation, which includes a housing having an opening and an accommodating space, the opening and the accommodating space being in communication with each other; a body accommodated in the accommodating space, the body being provided with a plurality of outlet units; a lifting means accommodated in the accommodating space, the lifting means being provided between the housing and the body, thereby lifting and lowering the body in the housing freely; and an operating means accommodated in the accommodating space, the operating means abutting and fixing the body.

The surge protector with spatial variation of the present invention has advantageous features as follows.

(I) The function of the outlet units can be expanded.

(II) The user can lift the body freely to use the outlet units in different orientations, thereby increasing its practicability.

(III) The present invention is a surge protector with three surfaces having outlet units, thereby increasing the usability options.

(III) The present invention can be applied to an extension socket, one embedded in a wall or other types of sockets.

In order to further understand the characteristics and technical contents of the present invention, a detailed description relating thereto will be made with reference to the accompanying drawings. However, the drawings are illustrative only, but not used to limit the scope of the present invention.

DETAILED DESCRIPTION OF PREFERRED EMBODIMENTS

Figure 1:
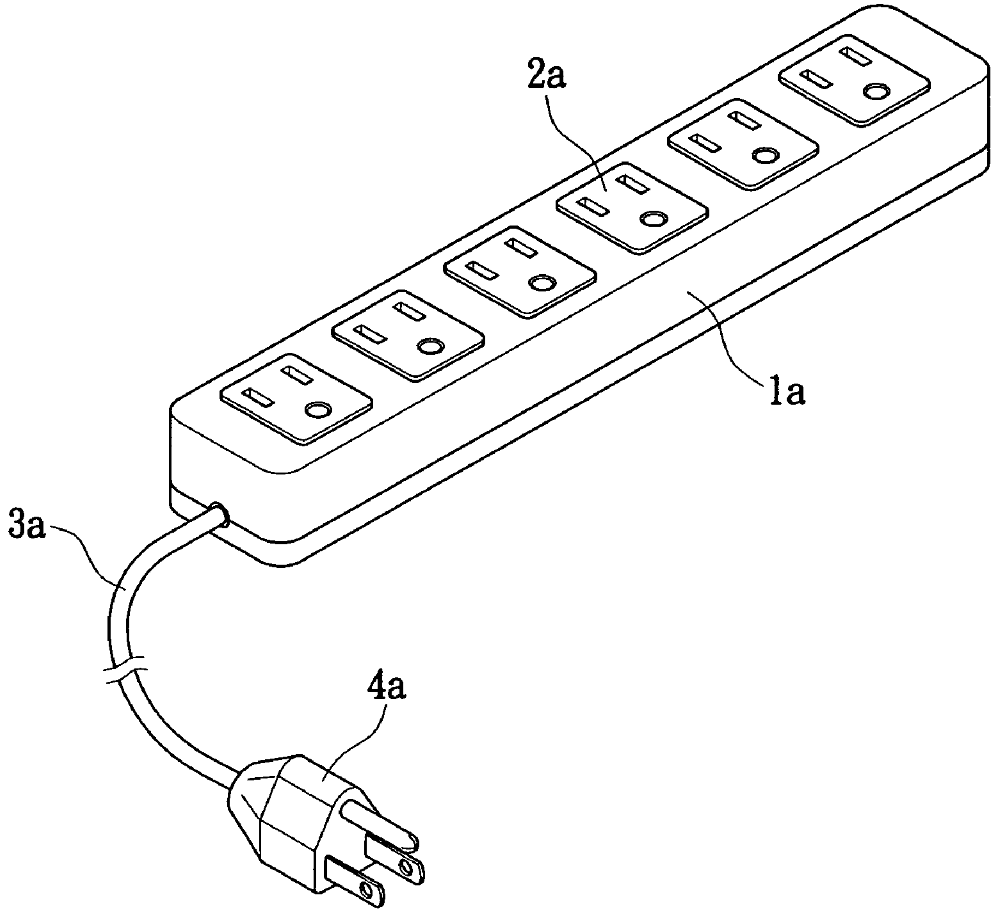
FIG. 1 PRIOR ART
FIG. 1 is a schematic view showing the external appearance of a conventional surge protector.
Figure 2:
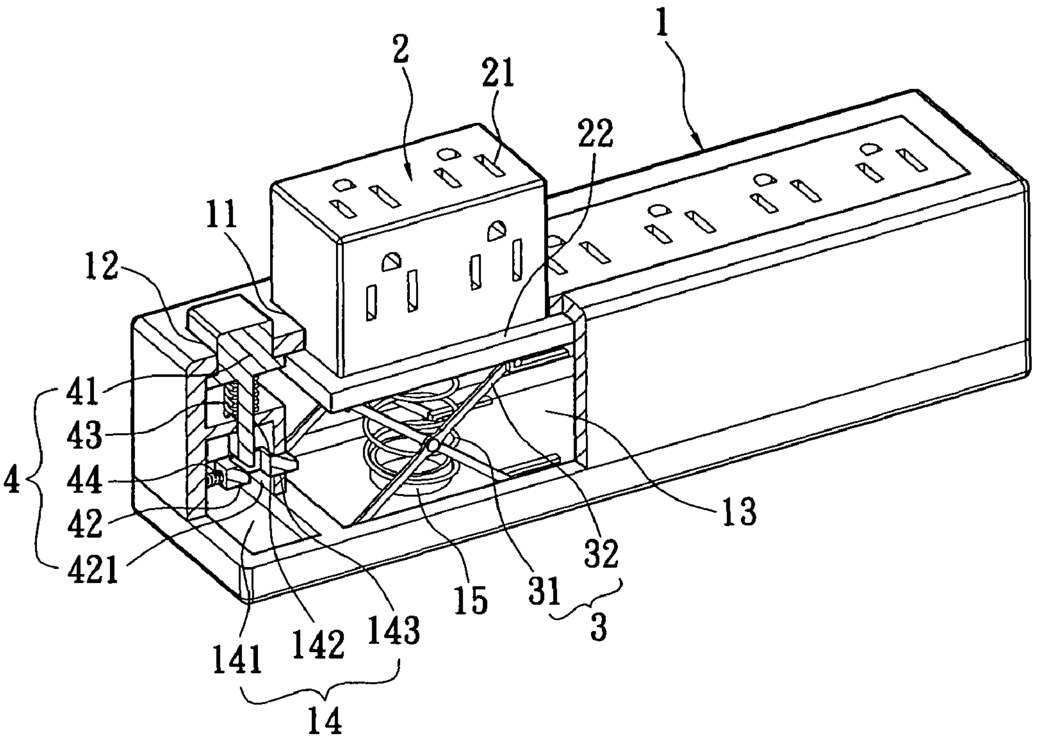
FIG. 2 is a schematic view showing the structure of the surge protector with spatial variation of the present invention.

Please refer to FIG. 2. The present invention provides a surge protector with spatial variation, which includes a housing 1, a body 2, a lifting means 3, and an operating means 4.

The housing 1 has an opening 11, a controlling piece opening 12, an accommodating space 13, a partition 14 and a plurality of fixing portions 15. The opening 11 and the controlling piece opening 12 are provided on a side wall of the housing 1 respectively and are in communication with the accommodating space 13 within the housing 1. The plurality of fixing portions 15 is provided at the bottom of the accommodating space 13 of the housing 1. The number of the fixing portions 15 can be one, two, three, or four. In the present embodiment, the number of the fixing portion 15 is one.

Figure 3:
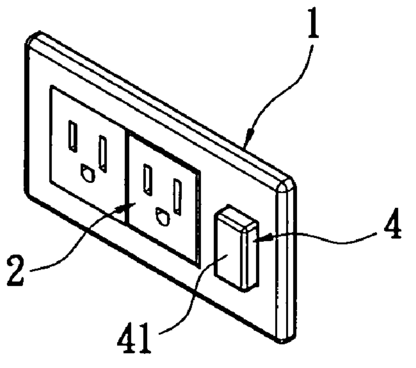
FIG. 3 is a schematic view showing the housing of the surge protector with spatial variation of the present invention.
Figure 4:
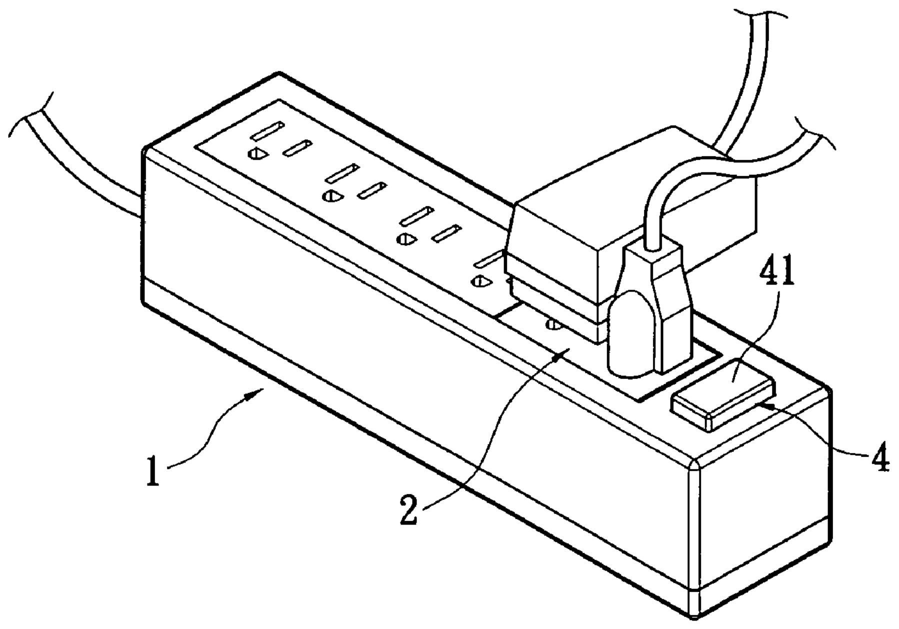
FIG. 4 is a schematic view showing another housing of the surge protector with spatial variation of the present invention.

The partition 14 is a curved plate extending from the side wall of the housing 1. A receiving space 141 is formed between the interior of the partition 14 and the housing 1. The partition 14 is provided with a first through hole 142 and a second through hole 143. The accommodating space 13 and the receiving space 141 are in communication with each other via the first through hole 142 and the second through hole 143. Further, the housing 1 can be formed into an extension type (FIG. 4) or one embedded in a wall (FIG. 3).

The body 2 is accommodated in the accommodating space 13. The body 2 has a plurality of outlet units 21 and an abutting plate 22. The plurality of outlet units 21 is provided on three side walls of the body 2, so that the user can choose the outlet units 21 on different side walls according to the practical demands. The abutting plate 22 is a plate extending from the periphery of the bottom of the body 2. The abutting plate 22 is used to restrict and fix the body 2 to the opening 11 of the housing 1, so that the body 2 can be accommodated in the housing 1 with the plurality of outlet units 2 being exposed to the outside of the opening 11. Further, the outlet unit 21 can be made according to US standard, Japan standard, European standard, or the like.

The lifting means 3 is provided in the accommodating space 13. The lifting means 3 comprises a plurality of springs 31 and a pair of cross connecting rods 32. One ends of the plurality of springs 31 are fixed to the fixing portion 15 of the housing 1, while the other ends abut the bottom of the body 2. The number of the spring 31 may be one, two, three, or four, which is selected according to the number of the fixing portions 15. Therefore, in the present embodiment, the number of the spring 31 is one. The pair of cross connecting rods 32 is formed by connecting two rods that cross each other and are rotatable. The pair of cross connecting rods 32 is provided between the housing 1 and the body 2. One ends of the pair of cross connecting rods 32 are connected to the housing 1, while the other ends are connected to the bottom of the body 2. With the interaction of the pair of cross connecting rods 32 and the plurality of springs 31, the body 2 can be lifted or lowered in the housing 1 freely.

The operating means 4 has a control piece 41, a positioning piece 42, a first compression spring 43, and a second compression spring 44. The control piece 41 is provided in the accommodating space 13 of the housing 1. One end of the control piece 41 is exposed to the outside of the controlling piece opening 12, while the other end passes through the first through hole 142 to be accommodated in the receiving space 141. The positioning piece 142 is received in the receiving space 141. Further, the positioning piece 42 is provided with a trough 421. The other end of the control piece 41 abuts the trough 421. One end of the positioning piece 42 passes through the second through hole 143 and is exposed inside the accommodating space 13 of the housing 1. With the abutting plate 22 of the body 2 selectively abutting the positioning piece 42, the body 2 can be restricted and fixed thereto.

The first compression spring 43 is disposed on the control piece 41. One end of the first compression spring 43 is connected to one end of the control piece 41, while the other end thereof is connected to an outer wall surface of the partition 14. The second compression spring 44 is provided in the receiving space 141. One end of the second compression spring 44 is connected to the housing 1, while the other end is connected to the other end of the positioning piece 42. The first compression spring 43 and the second compression spring 44 are used to provide elastic recovering forces.

Figure 5:
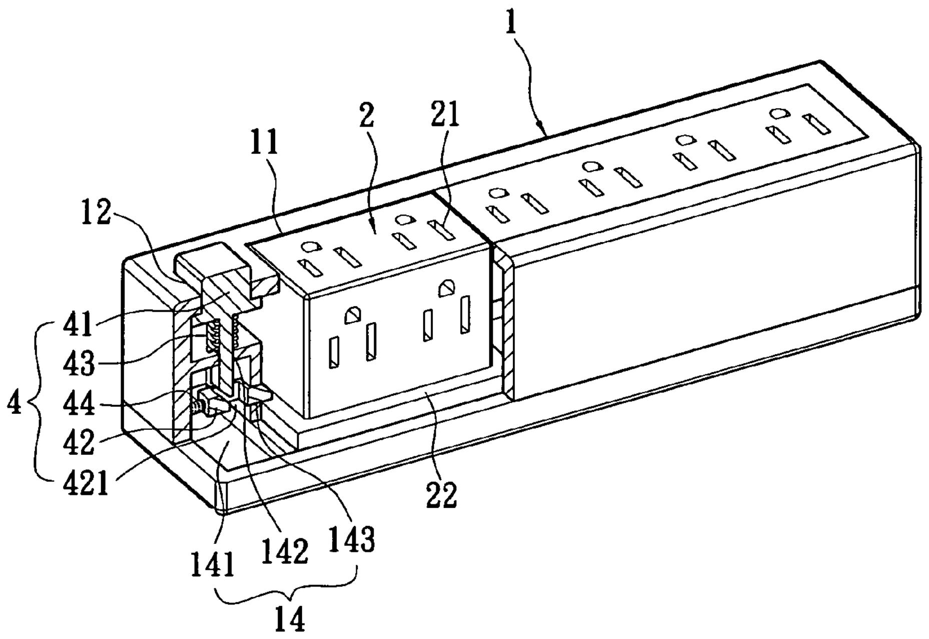
FIG. 5 is a schematic view showing the operating state of the surge protector with spatial variation of the present invention.
Figure 6:
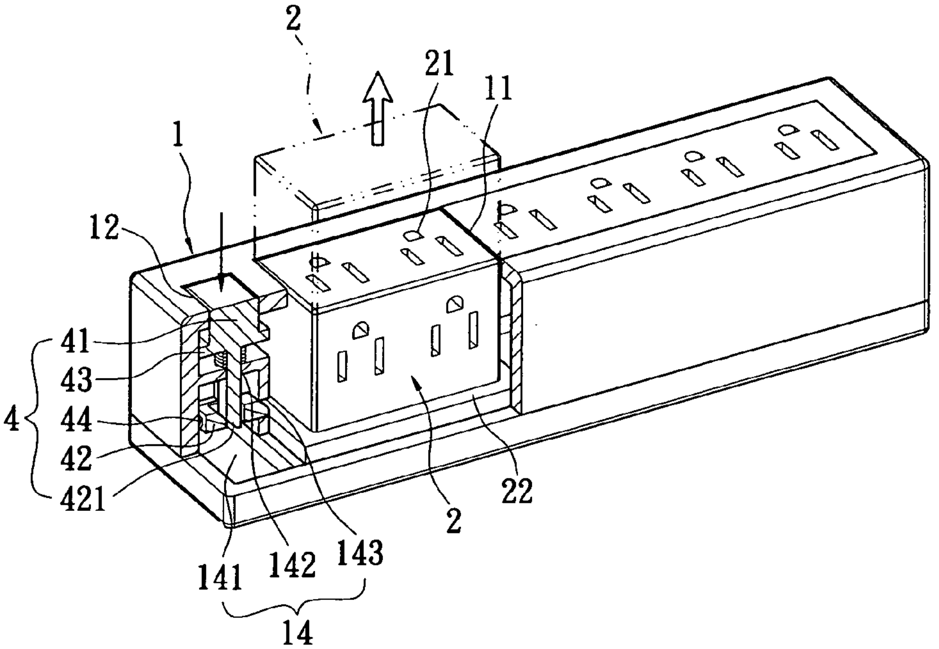
FIG. 6 is a schematic view showing another operating state of the surge protector with spatial variation of the present invention.

Please refer to FIGS. 5 and 6. In operation, the user only needs to press the control piece 41, and then the control piece 41 will drive the positioning piece 42. That is, the other end of the control piece 41 abuts the trough 421. Then, the positioning piece 42 moves toward the receiving space 141, so that the abutting plate 22 loses a place which it can abut. The body 2 is subjected to the action of the plurality of springs 31. At the same time, with the guiding of the pair of cross connecting rods 32, the body 2 moves upwardly in the accommodating space 13 until the abutting plate 22 of the body 2 abuts the opening 11 of the housing 1 and is fixed thereto. The outlet units 21 exposed to the three side walls of the body 2 (i.e. the outlets units 21 in different orientations) can be freely used by the user based on the practical demands, thereby increasing the usability options and convenience of the present invention.

Figure 7:
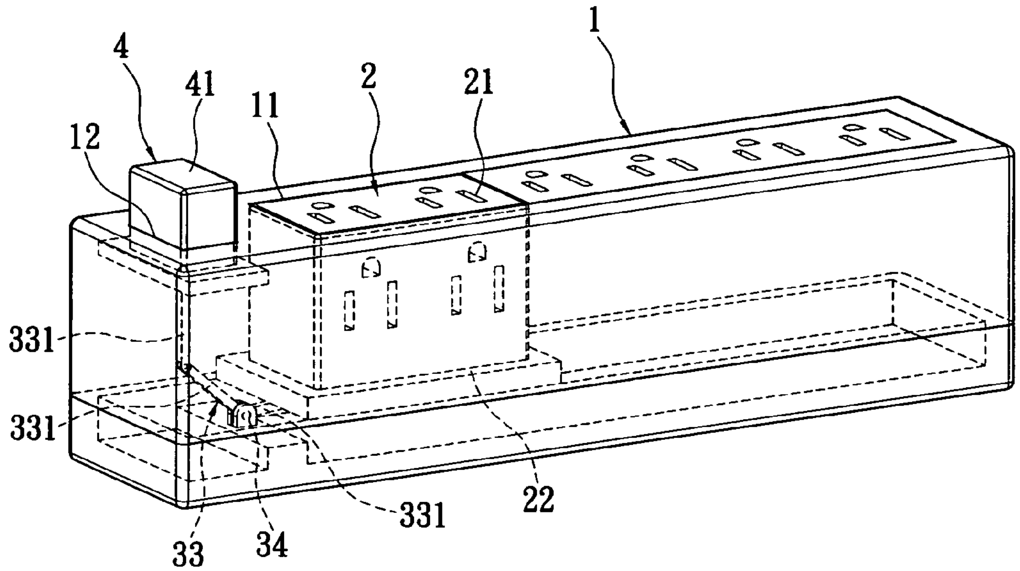
FIG. 7 is a schematic view showing another structure of the surge protector with spatial variation of the present invention.

Please refer to FIG. 7, which shows another embodiment of the present invention. In this embodiment, the operating means 4 is provided with the control piece 41 only. Further, the plurality of springs 31 and the pair of cross connecting rods 32 of the lifting means 3 are replaced by a set of levers 33 and a pivot 34. The pivot 34 is provided at the bottom of the accommodating space 13 of the housing 1. One ends of the set of levers 33 are connected to the bottom of the body 2, while the other ends are connected to the bottom of the control piece 41. The set of levers 33 are rotatably connected on the pivot 34. The set of levers 33 has a plurality of rods 331. The plurality of rods 331 are connected in series and cooperate with the pivot 34 to generate leverage. Further, the number of the rods 331 is not limited thereto and can be determined according to the user's demands. The number of the rods 331 may be two, three, or four. In the present embodiment, the number of the rods 331 is three.

Figure 8:
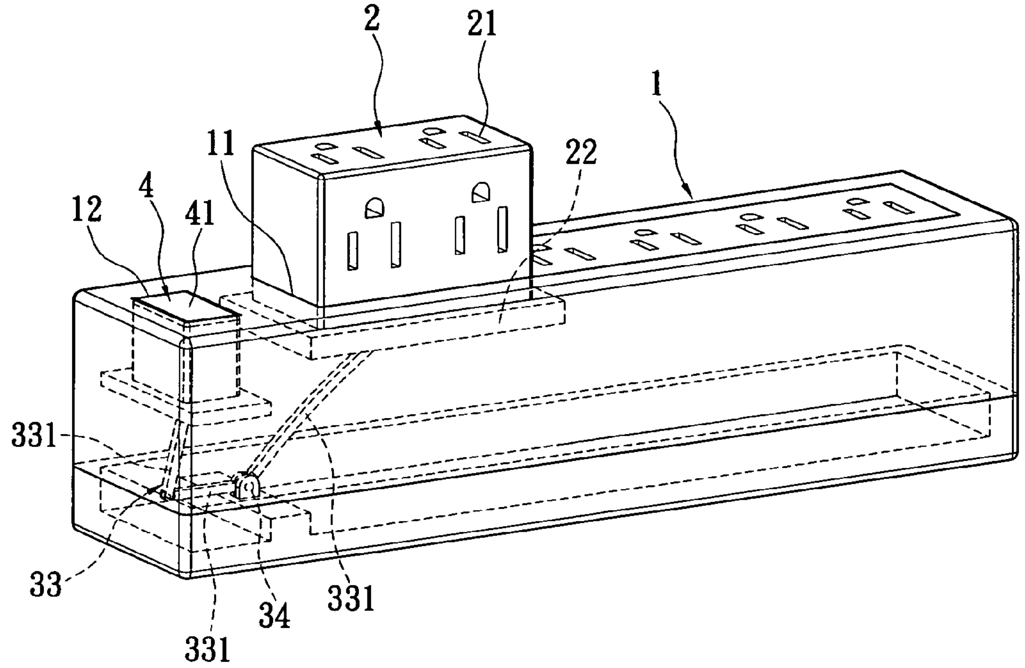
FIG. 8 is a schematic view showing the operating state of another structure of the surge protector with spatial variation of the present invention.

Please refer to FIG. 8. In operation, the user presses the control piece 41 to drive the levers 33 connected between the bottom of the control piece 41 and the bottom of the body 2. The set of levers 33 cooperates with the pivot 33 to lift the body 2, so that the body 2 can be lifted or lowered freely in the housing According to the above, the present invention has advantages as follows.

(I) According to the user's demands, the body of the surge protector can be lifted, so that the user can use the outlet units in different orientations, thereby increasing the practicability of the present invention.

(II) The present invention is a surge protector with three surfaces having outlet units, which provides the user with usability options.

(III) In addition to a common extension-type socket, the present invention can be applied to a socket embedded in a wall or the like.

While the present invention has been described in terms of what is presently considered to be the most practical and preferred embodiments, it is to be understood that the present invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A surge protector with spatial variation, comprising:

a housing having an opening and an accommodating space, the opening and the accommodating space being in communication with each other;

a body accommodated in the accommodating space, the body being provided with a plurality of outlet units;

a lifting means accommodated in the accommodating space, the lifting means being provided between the housing and the body, thereby lifting and lowering the body in the housing freely; and an operating means accommodated in the accommodating space, the operating means abutting and fixing the body.

2. The surge protector with spatial variation according to claim 1, wherein the plurality of outlet units is provided on three side walls of the body.

3. The surge protector with spatial variation according to claim 1, wherein the outlet unit is made according to US standard, Japan standard, or European standard.

4. The surge protector with spatial variation according to claim 1, wherein the housing is further provided with a controlling piece opening, a partition, and a plurality of fixing portions, the controlling piece opening is in communication with the accommodating space and is adjacent to the opening, the plurality of fixing portions is located at the bottom of the housing, the partition is a curved plate extending from a side wall of the housing, a receiving space is formed between the interior of the partition and the housing, the partition is provided with a first through hole and a second through hole, the first through hole and the second through hole are in communication with the accommodating space and the receiving space.

5. The surge protector with spatial variation according to claim 4, wherein an abutting plate extends from the periphery of the bottom of the body, the abutting plate restricts and fixes the body to the opening with the plurality of outlet units being exposed to the outside of the opening.

6. The surge protector with spatial variation according to claim 5, wherein the lifting means comprises a pair of cross connecting rods and a plurality of springs, the pair of cross connecting rods is provided between the housing and the body, one ends of the pair of cross connecting rods are connected to the housing, while the other ends are connected to the bottom of the body, the plurality of springs is located between the housing and the body, one ends of the plurality of springs are fixed to the plurality of fixing portions, while the other ends abut the bottom of the body.

7. The surge protector with spatial variation according to claim 5, wherein the operating means has a control piece, a positioning piece, a first compression spring, and a second compression spring, the control piece is located in the accommodating space, one end of the control piece is exposed to the outside of the controlling piece opening while the other end thereof passes through the first through hole to be received in the receiving space, the positioning piece is received in the receiving space with its one end being exposed to the inside of the accommodating space via the second through hole, the positioning piece is provided with a trough, the other end of the control piece abuts the trough, the first compression spring is disposed on the control piece, one end of the first compression spring is connected to one end of the control piece while the other end thereof is connected to an outer wall of the partition, one end of the second compression spring is connected to the housing while the other end thereof is connected to the other end of the positioning piece.

8. The surge protector with spatial variation according to claim 1, wherein the lifting means comprises a set of levers and a pivot, the pivot is provided at the bottom of the accommodating space of the housing, the set of levers are rotatably connected on the pivot, one ends of the set of levers are connected to the bottom of the body while the other ends thereof are connected to the bottom of the control piece, the set of levers further have a plurality of rods that are connected with each other.

9. The surge protector with spatial variation according to claim 8, wherein the number of the rods is two, three, or four.

10. The surge protector with spatial variation according to claim 1, wherein the housing is made into an extension-type or one embedded in a wall.

* * * * *